United States Patent
Van Der Merwe

(10) Patent No.: US 7,381,325 B1
(45) Date of Patent: Jun. 3, 2008

(54) SPA TREATMENT SYSTEM

(76) Inventor: Albert Van Der Merwe, 11072 Fairway Ridge La., Fishers, IN (US) 46038

( * ) Notice: Subject to any disclaimer, the term of this patent is extended or adjusted under 35 U.S.C. 154(b) by 642 days.

(21) Appl. No.: 11/119,160

(22) Filed: May 2, 2005

(51) Int. Cl.
*C02F 1/00* (2006.01)

(52) U.S. Cl. ............................. 210/167.11; 210/96.1; 210/149; 222/129; 422/105; 73/61.41

(58) Field of Classification Search ........... 210/167.11, 210/167.3, 96.1, 198.1, 149; 4/496; 222/52, 222/129, 255; 422/105; 73/61.41
See application file for complete search history.

(56) References Cited

U.S. PATENT DOCUMENTS

| 3,672,508 A | 6/1972 | Simon |
| 3,867,290 A | 2/1975 | Mackey |
| 5,422,014 A | 6/1995 | Allen et al. |
| 6,238,553 B1 | 5/2001 | Lin |
| 6,340,431 B2 | 1/2002 | Khan |
| 6,444,129 B1 | 9/2002 | Collins |
| 6,657,546 B2 * | 12/2003 | Navarro et al. ............ 340/653 |

* cited by examiner

*Primary Examiner*—Terry K Cecil

(57) ABSTRACT

A spa treatment system for maintaining spa water includes a spa that has a peripheral wall bounding an inner portion having water therein. An outlet and an inlet are each fluidly coupled to the inner portion. A water testing assembly is in fluid communication with the outlet. The water testing assembly is adapted for testing a pH level and an alkalinity level of the water. A plurality of containers is provided. A pump assembly is fluidly coupled to the inlet and to each of the containers for selectively pumping fluid outwardly of the containers as directed by the control in order to maintain proper pH and alkalinity levels.

9 Claims, 6 Drawing Sheets

SPA TREATMENT SYSTEM

BACKGROUND OF THE INVENTION

1. Field of the Invention

The present invention relates to water treating devices and more particularly pertains to a new water treating device for automatically treating a whirlpool spa to ensure that the proper chemicals are deposited in the spa as well as ensuring that the pH and alkalinity are within acceptable tolerances.

2. Description of the Prior Art

The use of water treating devices is known in the prior art. U.S. Pat. No. 6,444,129 describes a spa treatment device for adding chemicals to the spa at selected time intervals. Another type of water treating device is U.S. Pat. No. 3,867,290 which again includes a timer apparatus for selectively adding chemicals to a spa at predetermined time intervals. Still yet another such device is U.S. Pat. No. 3,672,508 which includes a system that is adapted for placing chemicals in a pool at selectable time intervals.

While these devices fulfill their respective, particular objectives and requirements, the need remains for a device that not only dispenses chemicals into a spa but also tests the water which is in the spa for pH and alkalinity. The device may then add chemicals as needed in order to balance the pH and alkalinity.

SUMMARY OF THE INVENTION

The present invention meets the needs presented above by generally comprising a spa that has a peripheral wall. An inner portion of the spa is bounded by the peripheral wall and water is positioned in the inner portion. An outlet and an inlet are each fluidly coupled to the inner portion. A water testing assembly is in fluid communication with the outlet. The water testing assembly is adapted for testing a pH level and an alkalinity level of the water. A plurality of containers is provided. Each of the containers has bottom wall, a top wall and a peripheral wall that is attached to and extends between the top and bottom walls. A plurality of spouts is also provided. Each of the spouts is fluidly coupled to one of the containers. A pump assembly is fluidly coupled to the inlet and to each of the containers. A control is operationally coupled to the water testing assembly and to the pump assembly. The control selectively turns on the pump assembly so that fluid in one of the containers is pumped into the water. The control actuates the pump assembly and pumps fluid from a first one of the containers when the water testing assembly detects that a pH of the water is low. The control actuates the pump assembly and pumps fluid from a second one of the containers when the water testing assembly detects that an alkalinity of the water is low. The control actuates the pump assembly and pumps fluid from a third one of the containers when the water testing assembly detects that the alkalinity of the water is high.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
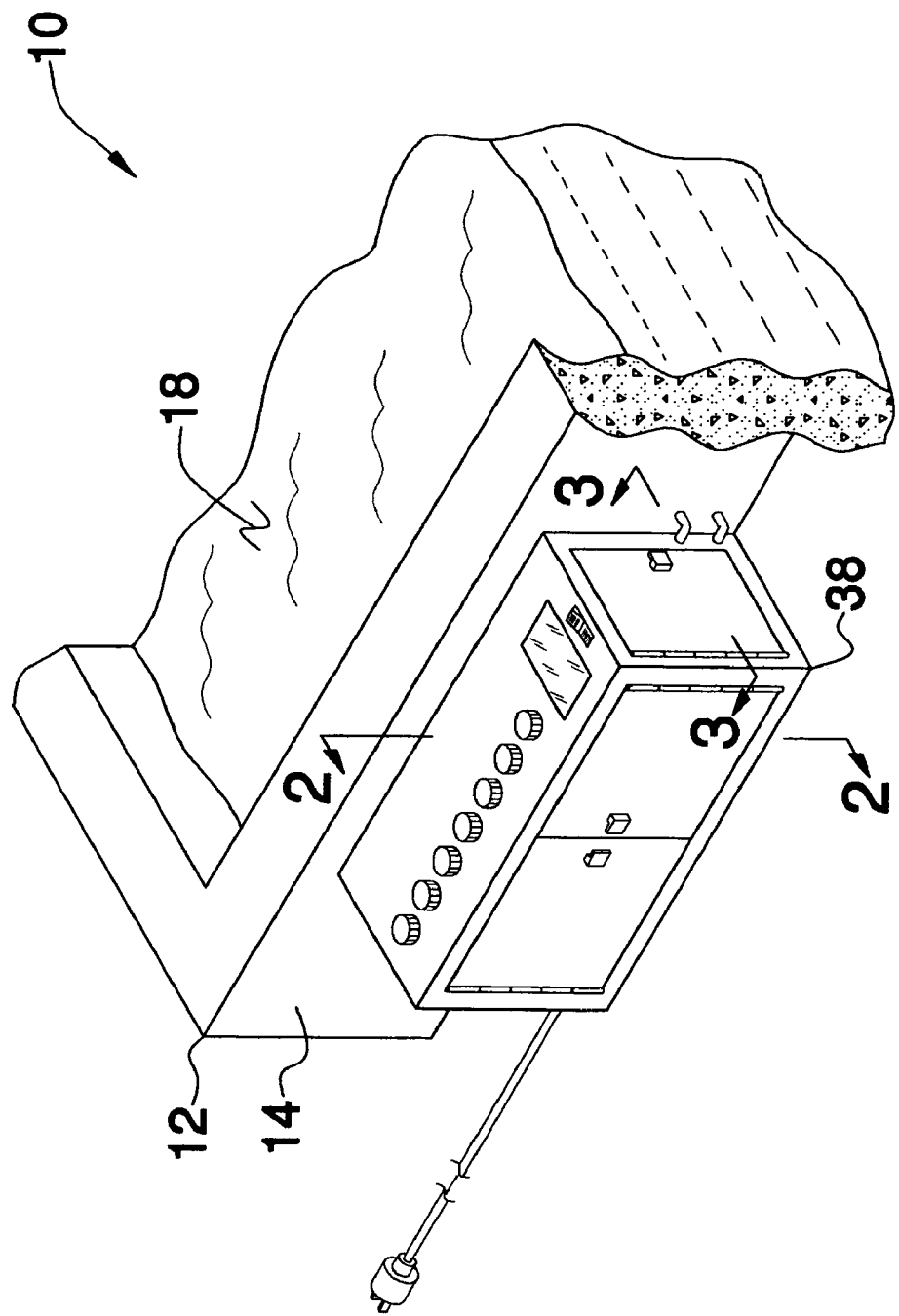
FIG. 1 is a perspective view of a spa treatment system according to the present invention.

With reference now to the drawings, and in particular to FIGS. 1 through 6 thereof, a new water treating device embodying the principles and concepts of the present invention and generally designated by the reference numeral 10 will be described.

As best illustrated in FIGS. 1 through 6, the spa treatment system 10 generally comprises a conventional whirlpool spa 12 has a peripheral wall 14 and an inner portion 16 of the spa 12 is bounded by the peripheral wall 14. Water 18 is positioned in the inner portion 16.

An outlet 20 is fluidly coupled to the inner portion 16 and an inlet 22 is also fluidly coupled to the inner portion 16. A water testing assembly 24 is in fluid communication with the outlet 20. The water testing assembly 24 is adapted for testing a pH level and an alkalinity level of the water 18.

A plurality of containers 26 is provided. Each of the containers 26 has bottom wall 28, a top wall 30 and a peripheral wall 32 that is attached to and extends between the top 30 and bottom 28 walls. A plurality of spouts 34 is also provided. Each of the spouts 34 is fluidly coupled to one of the containers 26. The spouts 34 are each positioned on a respective one of the top walls 30. The spouts 34 each have a removable cover 36 positioned thereon. The plurality of containers 26 preferably includes seven containers 26. The spouts' 34 are used for filling the containers 26 with the required chemicals.

A housing 38 has a lower wall 40, an upper wall 42, and a perimeter wall 44 that is attached to and extends between the upper 42 and lower 40 walls. Each of the containers 26 are positioned in the housing 38 and each of the spouts 34 extend upwardly through the upper wall 42. The housing 38 may be positioned to the side of, above, or built into the spa 12 as shown, respectively, in FIGS. 1, 5 and 6. The outlet 20 and inlet 22 each extends into the housing 38.

Figure 2:
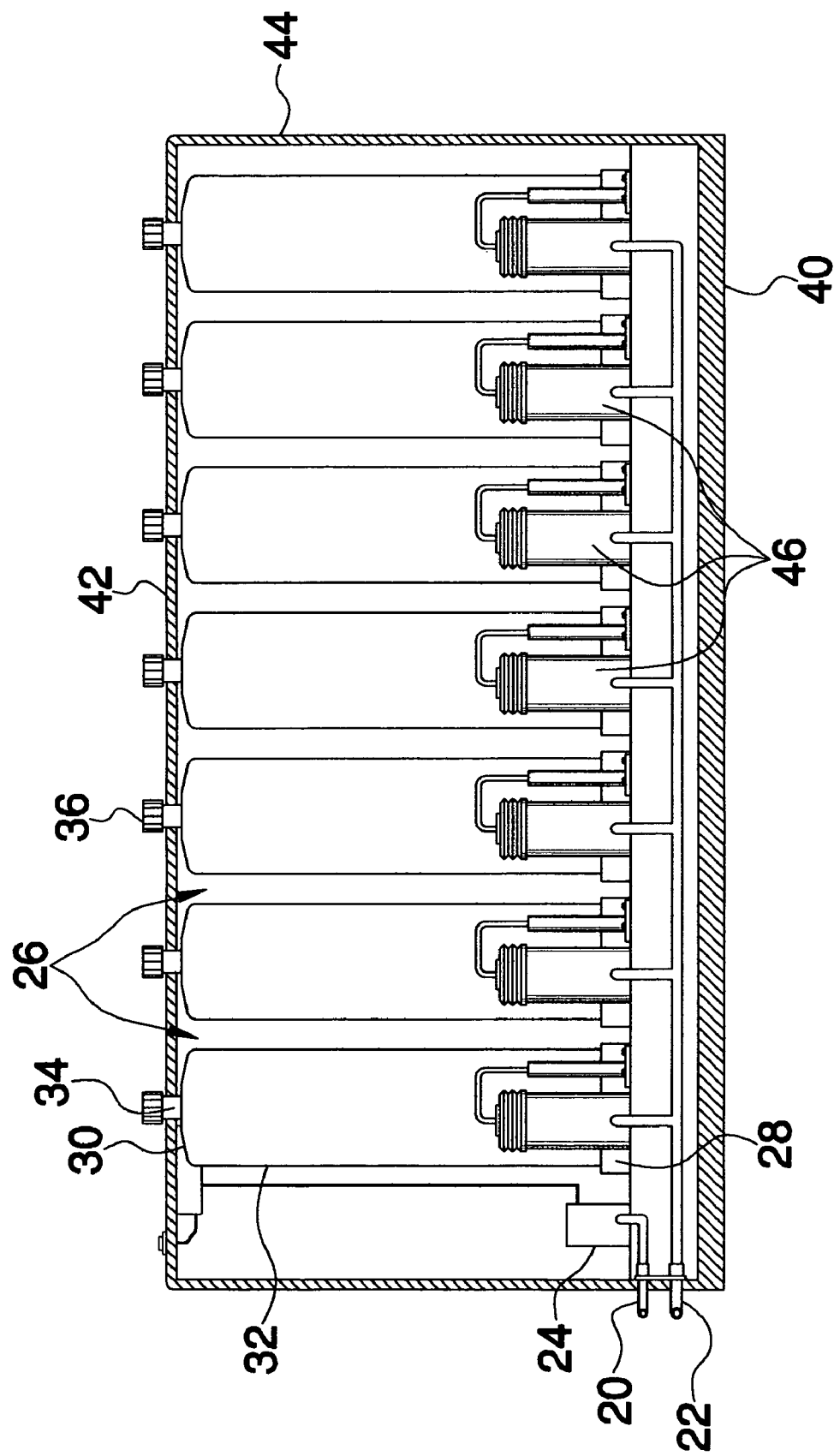
FIG. 2 is a cross-sectional view taken along line 2-2 of FIG. 1 of the present invention.
Figure 3:
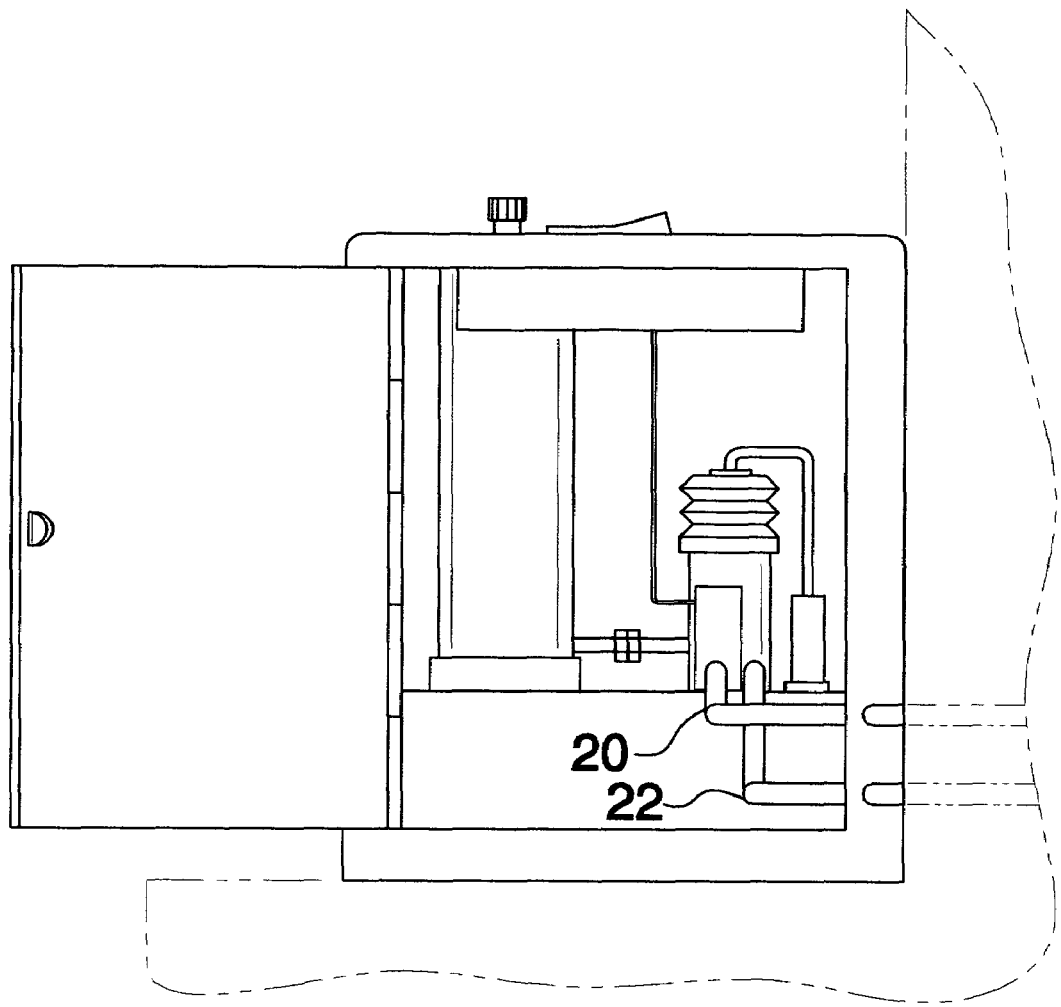
FIG. 3 is a cross-sectional view taken along line 3-3 of FIG. 1 of the present invention.
Figure 4:
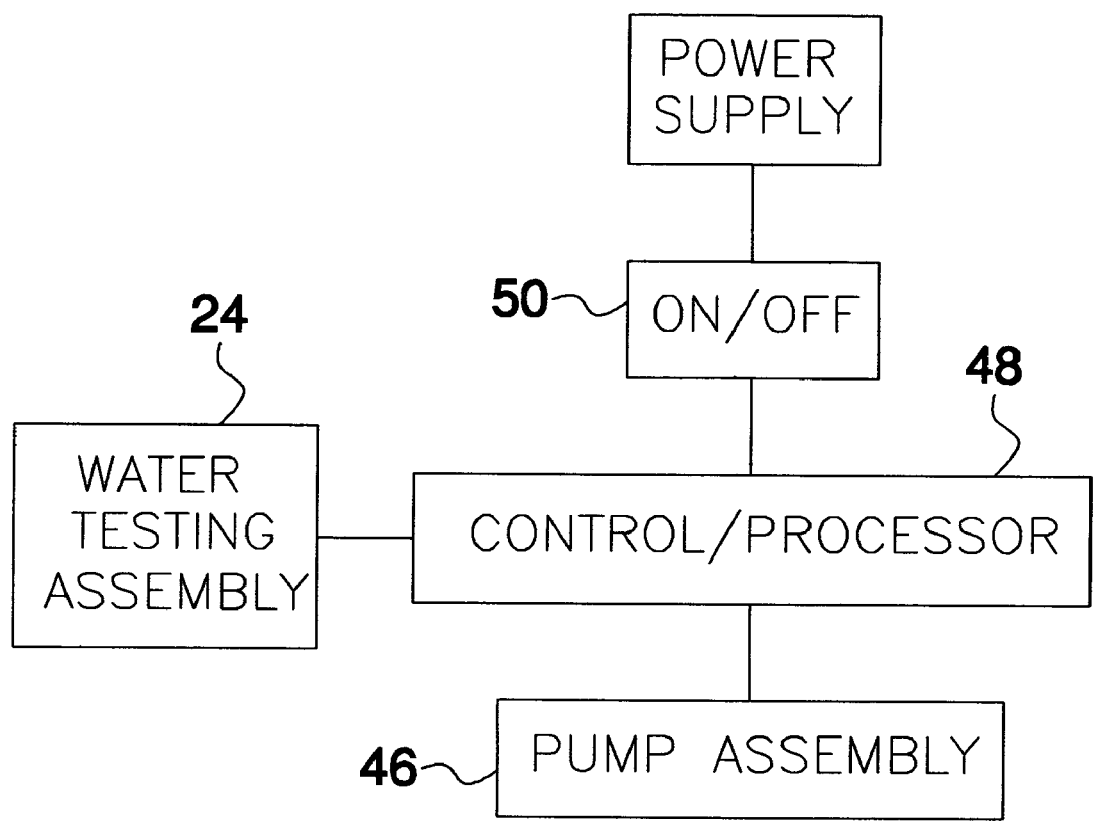
FIG. 4 is a schematic view of the present invention.
Figure 5:
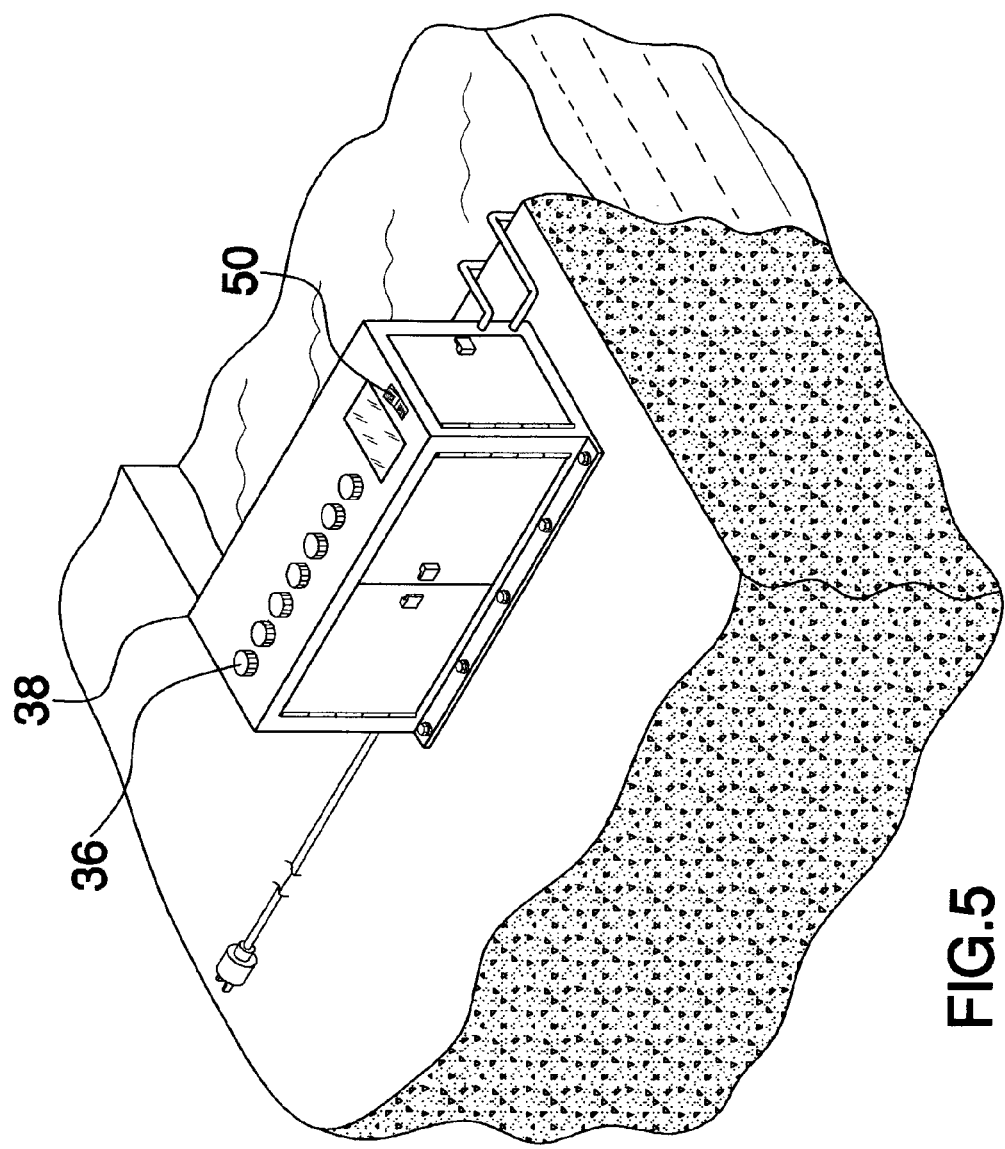
FIG. 5 is a perspective view of a second embodiment of the present invention.
Figure 6:
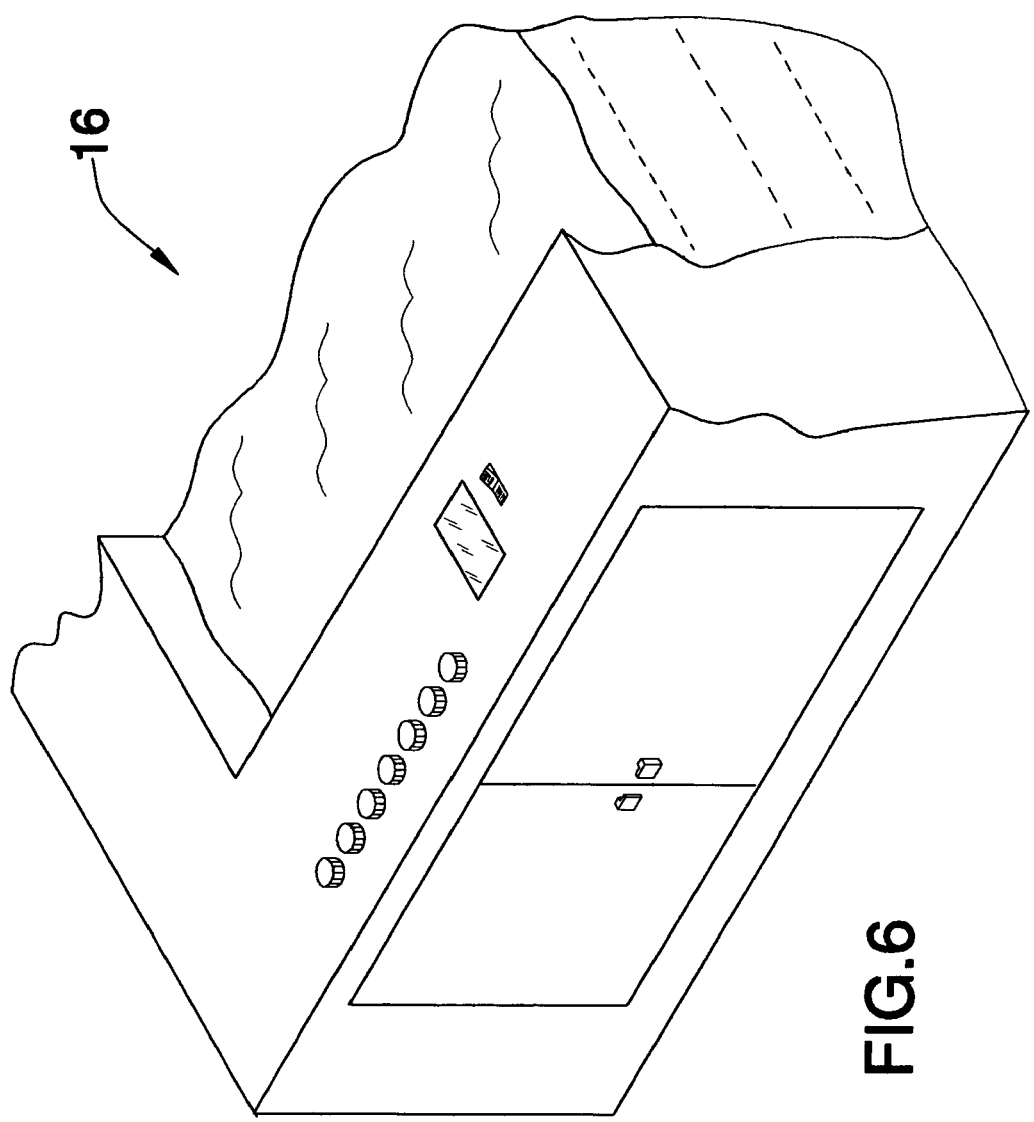
FIG. 6 is a perspective view of a third embodiment of the present invention.

A pump assembly 46 is fluidly coupled to the inlet 22 and to each of the containers 26. The pump assembly 46 may include a plurality of pumps, each fluidly coupled to one of the containers 46 as shown in FIG. 2. Alternatively, the pump assembly 46 may include one pump and a plurality of solenoid-actuated valves each fluidly coupled to one of the containers 26 and adapted for selectively opening and closing a connection between the containers 26 and the single pump. One-way valves may be included in the system 10 to prevent water from the spa from backing up into the containers 26.

A control 48 is operationally coupled to the water testing assembly 24 and to the pump assembly 46. The control 48 selectively turns on the pump assembly 46 so that fluid in one of the containers 26 is pumped into the water. The control 48 turns on the water testing assembly 24 at regular intervals and preferably includes a processor for tracking time. In particular, it is preferred that the control 48 turns on the water testing assembly three times during a week, such as, for example, on Mondays, Wednesdays and Fridays. The control 48 actuates the pump assembly 46 and pumps fluid from a first one of the containers 26 when the water testing assembly 24 detects that a pH of the water 18 is low, pumps fluid from a second one of the containers 26 when the water testing assembly 24 detects that an alkalinity of the water 18 is low, and pumps fluid from a third one of the containers 26 when the water testing assembly 24 detects that the alkalinity of the water 18 is high. The first, second and third containers 26 may then be filled with the appropriate chemicals for properly balancing the pH and alkalinity of the water. The processor, which is part of the control 48, is preferably programmed for keeping the pumping assembly 46 on for an amount of time as needed to ensure a proper amount of fluid is pumped out of the selected containers 26 and into the water 18. A power switch 50 is electrically coupled to the control 48 for turning the control 48 on or off.

The control 48 actuates the pump assembly 46 and pumps fluid from a fourth one and a fifth one of the containers 26 on a selected day of the week, such as, for example, Mondays. The control 48 actuates the pump assembly 46 and pumps fluid from a sixth one of the containers 26 two days after the selected day. The control 48 actuates the pump assembly 46 and pumps fluid from a seventh one of the containers 26 four days after the selected day. The fourth through seventh containers 26 may be filled with the appropriate chemicals required to keep the spa 12 clean and may only be used as needed. Preferably, the control 48 turns on the water testing assembly 24 on the selected day, 2 days after the selected day and 4 days after the selected day.

In use, the system 10 performs, in an automated manner, those functions typically done by a person who owns or maintains a spa 12. The chemicals positioned in the containers 26 are conventional and would be the same chemicals used by the person who would be maintaining the spa 12. The control 26 automates the process and ensures that the spa 12 will be balanced and clean at all times.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An automated water testing and treatment system for a spa, said system comprising:
   a spa having a peripheral wall, an inner portion of said spa being bounded by said peripheral wall, water being positioned in said inner portion;
   an outlet being fluidly coupled to said inner portion;
   an inlet being fluidly coupled to said inner portion;
   a water testing assembly being in fluid communication with said outlet, said water testing assembly being adapted for testing a pH level and an alkalinity level of said water;
   a plurality of containers, each of said containers having bottom wall, a top wall and a peripheral wall being attached to and extending between said top and bottom walls, a plurality of spouts, each of said spouts being fluidly coupled to one of said containers;
   a pump assembly being fluidly coupled to said inlet and to each of said containers;
   a control being operationally coupled to said water testing assembly and to said pump assembly, said control selectively turning on said pump assembly such that fluid in one of said containers is pumped into said water, said control actuating said pump assembly and pumping fluid from a first one of said containers when said water testing assembly detects that a pH of said water is low, said control actuating said pump assembly and pumping fluid from a second one of said containers when said water testing assembly detects that an alkalinity of said water is low, said control actuating said pump assembly and pumping fluid from a third one of said containers when said water testing assembly detects that the alkalinity of said water is high.

2. The system according to claim 1, further including a housing having a lower wall, an upper wall, and a perimeter wall being attached to and extending between said upper and lower walls, each of said containers being positioned in said housing, each of said each of said spouts being positioned on a respective one of said top walls, each of said spouts extending upwardly through said upper wall.

3. The system according to claim 1, wherein said control turns on said water testing assembly at regular intervals.

4. The system according to claim 1, wherein said control actuates said pump assembly and pumps fluid from a fourth one and a fifth one of said containers on a selected day of the week.

5. The system according to claim 4, wherein said control actuates said pump assembly and pumps fluid from a sixth one of said containers 2 days after the selected day.

6. The system according to claim 5, wherein said control actuates said pump assembly and pumps fluid from a seventh one of said containers 4 days after the selected day.

7. The system according to claim 6, wherein said control turns on said water testing assembly on said selected day, 2 days after said selected day and 4 days after said selected day.

8. The system according to claim 4, wherein said control turns on said water testing assembly on said selected day, 2 days after said selected day and 4 days after said selected day.

9. An automated water testing and treatment system for a spa, said system comprising:
   a spa having a peripheral wall, an inner portion of said spa being bounded by said peripheral wall, water being positioned in said inner portion;
   an outlet being fluidly coupled to said inner portion;
   an inlet being fluidly coupled to said inner portion;
   a water testing assembly being in fluid communication with said outlet, said water testing assembly being adapted for testing a pH level and an alkalinity level of said water;
   a plurality of containers, each of said containers having bottom wall, a top wall and a peripheral wall being attached to and extending between said top and bottom walls, a plurality of spouts, each of said spouts being fluidly coupled to one of said containers, each of said spouts being positioned on a respective one of said top walls, said plurality of containers including seven containers;

a pump assembly being fluidly coupled to said inlet and to each of said containers;

a control being operationally coupled to said water testing assembly and to said pump assembly, said control selective turning on said pump assembly such that fluid in one of said containers is pumped into said water, said control turning on said water testing assembly at regular intervals, said control actuating said pump assembly and pumping fluid from a first one of said containers when said water testing assembly detects that a pH of said water is low, said control actuating said pump assembly and pumping fluid from a second one of said containers when said water testing assembly detects that an alkalinity of said water is low, said control actuating said pump assembly and pumping fluid from a third one of said containers when said water testing assembly detects that the alkalinity of said water is high, said control actuating said pump assembly and pumping fluid from a fourth one and a fifth one of said containers on a selected day of the week, said control actuating said pump assembly and pumping fluid from a sixth one of said containers 2 days after the selected day, said control actuating said pump assembly and pumping fluid from a seventh one of said containers 4 days after the selected day, said control turning on said water testing assembly on said selected day, 2 days after said selected day and 4 days after said selected day; and a housing having a lower wall, an upper wall, and a perimeter wall being attached to and extending between said upper and lower walls, each of said containers being positioned in said housing, each of said spouts extending upwardly through said upper wall.

* * * * *